United States Patent
Todasco et al.

(10) Patent No.: US 10,755,582 B2
(45) Date of Patent: Aug. 25, 2020

(54) DRONE PHYSICAL AND DATA INTERFACE FOR ENHANCED DISTANCE COVERAGE

(71) Applicant: PAYPAL, INC., San Jose, CA (US)

(72) Inventors: Michael Charles Todasco, Santa Clara, CA (US); Timothy Resudek, San Jose, CA (US); Titus Woo, Santa Clara, CA (US); Anush Vishwanath, Santa Clara, CA (US); Gautam Madaan, San Jose, CA (US); Zachary Joseph Berman, San Jose, CA (US); Braden Christopher Ericson, San Jose, CA (US); Lars Holger Alexander Steinmetzger, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 237 days.

(21) Appl. No.: 15/856,942

(22) Filed: Dec. 28, 2017

(65) Prior Publication Data
US 2019/0206264 A1 Jul. 4, 2019

(51) Int. Cl.
G08G 5/00 (2006.01)
B64C 39/02 (2006.01)
G05D 1/00 (2006.01)

(52) U.S. Cl.
CPC ......... *G08G 5/0008* (2013.01); *B64C 39/024* (2013.01); *G05D 1/00* (2013.01); *G08G 5/0021* (2013.01); *G08G 5/0069* (2013.01); *B64C 2201/146* (2013.01)

(58) Field of Classification Search
CPC ............ B64C 2201/146; B64C 39/024; G08G 5/0008; G08G 5/0021; G08G 5/0069
See application file for complete search history.

(56) References Cited

U.S. PATENT DOCUMENTS

| 8,982,207 | B2 * | 3/2015 | Jang ......................... B64F 5/60 |
| | | | 348/128 |
| 9,056,676 | B1 * | 6/2015 | Wang ....................... B64F 1/00 |
| 9,371,133 | B2 * | 6/2016 | Mays .................... B64C 39/024 |
| 10,120,376 | B2 * | 11/2018 | Boss ....................... B64D 27/24 |
| 10,287,014 | B2 * | 5/2019 | Erickson ............... B64C 39/024 |
| 10,303,171 | B1 * | 5/2019 | Brady .................... G08G 1/207 |
| 2010/0250022 | A1 * | 9/2010 | Hines ..................... G05D 1/101 |
| | | | 701/2 |
| 2017/0011340 | A1 * | 1/2017 | Gabbai ............. G06Q 10/0836 |
| 2017/0235316 | A1 * | 8/2017 | Shattil .................... G05D 1/104 |
| | | | 701/3 |

(Continued)

*Primary Examiner* — Babar Sarwar
(74) *Attorney, Agent, or Firm* — Haynes and Boone, LLP (57) ABSTRACT

There are provided systems and methods for a drone physical and data interface for enhanced distance coverage. An unmanned aerial vehicle or a drone may be unable to operate over a distance due to range limitations. The drone may utilize onboard systems and communications with other devices and servers to detect another vehicle operating over at least a portion of the distance, where connecting to the vehicle and using the vehicles resources for travel over the portion of the distance decreases the flight time of the drone. The drone may utilize a camera and communications with the vehicle or server to determine a connection point to the vehicle, and may connect to the vehicle to travel the portion of the distance. If the drone has not yet arrived at the destination and still requires further assistance reaching it, the drone may locate another vehicle to further use.

20 Claims, 6 Drawing Sheets

(56) References Cited

U.S. PATENT DOCUMENTS

| | | | |
|---|---|---|---|
| 2017/0343645 A1* | 11/2017 | Kim | F42B 10/48 |
| 2017/0355459 A1* | 12/2017 | Erickson | B64C 39/024 |
| 2018/0039262 A1* | 2/2018 | Fox | G01S 19/51 |
| 2018/0050800 A1* | 2/2018 | Boykin | H04N 5/23206 |
| 2018/0089622 A1* | 3/2018 | Burch, V | G01S 19/49 |
| 2018/0150072 A1* | 5/2018 | Boss | B64D 27/24 |
| 2018/0181116 A1* | 6/2018 | Lee | G05D 1/101 |
| 2018/0261112 A1* | 9/2018 | O'Brien | G08G 5/0069 |
| 2019/0033043 A1* | 1/2019 | Piccioni | A45F 3/005 |
| 2019/0051169 A1* | 2/2019 | Gomez Gutierrez | G08G 7/00 |
| 2019/0055015 A1* | 2/2019 | Allard | G06Q 10/00 |
| 2019/0066503 A1* | 2/2019 | Li | G05D 1/0276 |
| 2019/0197890 A1* | 6/2019 | Du | G08G 5/0069 |
| 2019/0265705 A1* | 8/2019 | Zhang | B64C 39/024 |
| 2019/0313228 A1* | 10/2019 | Ferreira | B64C 39/024 |
| 2019/0348857 A1* | 11/2019 | Dudar | B64C 39/024 |

\* cited by examiner

DRONE PHYSICAL AND DATA INTERFACE FOR ENHANCED DISTANCE COVERAGE

TECHNICAL FIELD

The present application generally relates to unmanned aerial vehicles interfacing with other devices and vehicles and more specifically to increasing an effective range of an unmanned aerial vehicle through the use of physical interfaces and data communications with other devices and vehicles.

BACKGROUND

Unmanned aerial vehicles (UAVs), also referred to more commonly as drones, may correspond to an automated device and system capable of travelling distances, moving packages and other goods or items, detecting information, communicating with other devices over short and/or long ranges, and various other actions. Since UAVs do not require active and participating user involvement, UAVs may provide cost benefits over manned vehicles, such as cars, trucks, or other operational vehicles including lower operating costs, fewer dangers of usage and/or travel, and increased accessibility to areas that may be dangerous for normal human travel. UAVs may be equipped with specific sensors and/or components that may facilitate in the navigation of a UAV to a location and/or the performance of the UAV at that location or along a route to the location, which may allow the UAVs to operate without human intervention. However, UAVs generally are required to be preprogrammed or instructed to follow a particular route. Moreover, UAVs operate only within a certain distance and/or operational range of their communication systems, power sources, and/or configurations. Thus, UAVs that need to travel distances current operational ranges have not yet been able to do so as well as operate and utilize other components of the UAVs to provide additional functionality. Thus, UAVs still remain range limited for various types of functional uses of the UAVs.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a drone physical and data interface for enhanced distance coverage. Systems suitable for practicing methods of the present disclosure are also provided.

According to various embodiments, an unmanned aerial vehicle (UAV, also referred to herein as an unmanned aerial system (UAS) or drone, and may include other unmanned vehicles including ground or sea based vehicles), may utilize transportation on or with another longer range vehicle or transportation means that increases the effective range of the UAV. These UAVs may travel at one or more altitudes according to a flight plan or route in order to perform a desired operation, including pick-up and delivery of items (e.g., goods, products, and/or services). UAVs described herein may also perform other operations, including data capture, data transportation between points, signal detection, and/or communications and communication relaying. Thus, a UAV performing these operations may include physical components (e.g., mechanical components and electronics) that allow for air (or land/water) based transportation over a desired or predetermined distance. The UAV may further include a controller, such as a flight control unit, that allows for navigation and operation of the UAV over the desired distance, which may allow for both human controlled operation from a distance (e.g., remote controlled operation) and autonomous operation through data detection (e.g., nearby imaging, infrared sensing, etc.) and/or route navigation and execution of operations (e.g., through a preprogrammed route or to a destination using data detection for navigation). The controller of the UAV may include a location detection component, such as a GPS unit, which may assist in navigation of the UAV and provide location data of the UAV to a service provider or vehicle for processing. The UAV may also include a payload bay or unit that may allow for various operations, including the pick-up/delivery of items, data capture, signal detection, and/or communications through one or more components provided in the payload unit or otherwise attached to the UAV. Moreover, the UAV may include a transceiver that may allow for wireless communications with one or more other devices or servers, including over cellular communications (e.g., 3G, 4G, 4G Long Term Evolution (LTE), 5G, other 3$^{rd}$ Generation Partnership Project (3GPP)-based cellular communications), WiFi, Bluetooth, Bluetooth Low Energy (BLE), or other radio modules. The UAV may therefore communicate with other entities for control, instructions, and/or route determinations.

The UAV may also include a latching or connection component and mechanism (also referred to herein as a "UAV latch") configured to physically interface with a longer range vehicle that may have a further effective range than the UAV (e.g., based on available power and/or power consumption, speed, etc.). In various embodiments, the vehicle may correspond to a car, bus, truck, or other land based and human operated vehicle that may be driven by a user. However, the UAV may also interface with other types of vehicles, including trains, boats, planes, and other types of vehicles that have a further effective range of travel than a UAV for reasons related to available power, communication signal range, route navigation and execution, or other limiting factors to the UAVs operation over a distance. In order to physically interface with the UAV to allow the UAV to connect with and attach to the vehicle and use the vehicle for transportation (e.g., where the UAV uses no or minimal power for travel when attached to the vehicle), the vehicle may provide a similar and corresponding latching or connection component and mechanism (also referred to herein as a "vehicle latch") on an external surface, such as a roof, trunk area, cargo compartment, or other external area of the vehicle that is accessible by the UAV. The vehicle latch may come preinstalled or manufactured on the vehicle, or may be installable utilizing various components, such as a physical kit having one or more components for installation on the external surface of the vehicle. In certain embodiments, the latching component and mechanism of the UAV and vehicle may instead be provided as an internal cargo compartment where the UAV may be received by the vehicle and may conceal the UAV in the vehicle. The UAV latch may physically interface with the vehicle latch to provide a securing mechanism that couples or otherwise secures the UAV to the vehicle. For example, the UAV latch and the vehicle latch may mechanically, electrically, and/or magnetically interact and connect so as to form a physical, electrical, and/or magnetic attachment or connection between the vehicle and the UAV. The interlocking latches may therefore provide a secure connection that may hold or secure the UAV to the vehicle. The latches may also form a connection mechanism that lets the UAV travel on or with the vehicle while requiring minimal or no additional power to operate the UAV (e.g., fly or otherwise cause the UAV to move). In various embodiments, additional forces may also be used to form the connection mechanism, including downward pressure forces caused by wind or air on the vehicle and/or UAV. Thus, the latches between the UAV and the vehicle may allow the UAV to "piggyback" or travel with the vehicle without or minimally consuming resources, such as a UAV power source.

The vehicle and/or vehicle latch may also include additional functionality to interact with the UAV. For example, the vehicle and/or vehicle latch may include a wired and/or wireless transceiver that may broadcast or transmit to the UAV and receive data from the UAV. A wireless transceiver may be used to communicate with the UAV over desired distances, including through cellular channels, networks, and/or direct communications over the aforementioned communication protocols. Once latched onto the vehicle and connected, a wired connection may be used for more secure and reliable communications, which may also allow the UAV to utilize wireless communications of a device for the vehicle or in communication with the vehicle (e.g., an onboard or console computing device or a mobile device in the vehicle and connected to the vehicle's system or device). The vehicle latch may also provide a power and/or charging mechanism for the UAV, which may include a mechanical or magnetic connection that allows for wired charging and/or wireless inductive charging where a power source of the UAV accepts wireless charging. The vehicle latch may also instead have a battery exchange mechanism that may mechanically exchange a physical battery pack of the UAV (e.g., through a spring loaded or mechanical component with operational electronics) with a battery source of the vehicle. The vehicle latch and/or vehicle may include a visual identification area and component, which may allow the UAV to identify and locate the vehicle, as well as arrange the UAV for connection to the vehicle using the latches. The visual indicator may include a static image or output, such as a sticker or an attachable image of a QR code or barcode. The static output may include a light, shape, or color that may be identified by the drone, including lights or outputs outside the visual spectrum. The visual indicator may also correspond to a dynamic output, including a light that emits a pattern of outputs and/or colors to identify the vehicle and/or a changeable QR or barcode having encoded data, for example, through an e-ink display, LCD panel, or other output display.

Once the vehicle is configured to accept and connect with one or more UAVs, the vehicle may be eligible to assist UAVs in travelling greater distances and extending the effective coverage and operation range of the UAV. A UAV may receive destination information for the UAV, which may include at least a destination geo-location that may be used with the UAV components to navigate to the destination geo-location (e.g., coordinates such as longitude, latitude, and/or altitude). The altitude coordinate may be a distance (e.g., height) from a reference sea level. In some cases, rather than the longitude, latitude, and/or altitude coordinates, other coordinate systems by which to define the position of the UAV may also or alternatively be received. The UAV may also receive a route, which may include directions (e.g., map directions including landmarks, or more generally waypoints at longitude, latitude, and altitude to travel to). The UAV may utilize the controller to execute a flight route to the destination geo-location using the components of the UAV. In order to increase the effective range of the UAV, for example, to allow the UAV to serve more locations and/or reach a destination location that may be outside of the range of operation of the UAV absent an interaction with a vehicle, the UAV may determine a vehicle that may be used to reduce the operation/flight time or power consumption and/or increase the range of use of the UAV. For example, the UAV may be required to operate for a set time and/or use a certain amount of power to reach the destination or travel along the route. The operation time or power consumption for such travel may exceed what the UAV is capable of performing. The UAV may therefore be range limited to a specific operation/flight time and power consumption. By utilizing the vehicle, the UAV may therefore reduce the operation/flight time or power consumption required to reach the destination, resulting in an increased effective range of the UAV.

Thus, the vehicle may share at least a portion of the route that is required to be traveled by the UAV, or may travel in a direction for a time that gets the UAV closer to the destination without requiring the UAV to utilize resources or requiring a reduced use of resources. Detection and determination of vehicles that may be used to reduce the operation and/or flight time of the UAV to the destination, and therefore conserve power of the UAV and allow the UAV to travel a further effective range, may be determined prior to beginning travel to the destination and/or while travelling to the destination. In order to determine where the vehicle is travelling, the vehicle may provide a travel route, destination, and/or current direction of travel to the UAV, which may be used to determine if the vehicle's travel matches or is close enough to what is required by the UAV to conserve the UAV's resources and allow the UAV to serve a larger range. For example, the current travel route, pathway, or direction of travel of the vehicle may cover at least a portion of the UAV's travel route to the destination, and may therefore allow the UAV to travel toward the destination without consuming or consuming less power. The data for the vehicle's travel may be entered to and/or generated by an onboard system, such as a GPS and mapping system, or by a device associated with the vehicle, such as a mobile device within the vehicle that is providing mapping services. Thus, the vehicle may output data for the vehicle's travel information to the UAV over a wireless connection with the UAV.

Data of the vehicle's travel route, destination, and/or current direction of travel may be provided to the UAV directly for processing by the vehicle using the vehicle's (or a device associated with the vehicle) wireless transceiver, which may communicated over longer distances using cellular network communication, or may be localized through short range wireless communications (e.g., WiFi, Bluetooth, BLE, etc.). In other embodiments, the data may be provided to a centralized service provider, such as a service provider's central or cloud computing servers, to allow the service provider to communicate with the UAV to control the UAV and/or provide data of available vehicle's traveling in the same or similar direction as that required by the UAV to extend the UAV's coverage. Thus, a service provider may also interact with the vehicle's device, vehicle route data, the UAV, and the UAV's required destination to provide one or more of the processing features discussed herein.

Once the vehicle's travel data is received and the UAV (or the service provider) confirms that the travel data allows the UAV to utilize the vehicle to cover at least a portion of the travel required to the UAV's destination, thereby increasing the UAV's effective range and reducing power required to the destination, the UAV may determine a route to meet the vehicle and physically interface with the vehicle to utilize the vehicle for travel (e.g., piggyback on the vehicle for an amount of time to travel toward the endpoint of the UAV). In order to meet the vehicle, the UAV may be required to determine a location and a time where the vehicle will be so that the UAV can access at the same time and connect with the vehicle. Using the route information provided by the vehicle's device, the UAV may determine a future location of the vehicle that is accessible to the UAV at a specific time. This may include a map location, such as a street address, intersection, landmark, or other data, or may correspond to a geo-location such as a longitude and latitude. The UAV may determine a travel route to the meeting location with the vehicle, and may execute instructions to travel on the route and arrive at the location prior to, at the same time, or after the vehicle being at the location. In various embodiments, such determination of a meeting time and location may be performed by a service provider instead and communicated to the UAV, as discussed above. Where a vehicle communicates locally with nearby UAVs using short range communications (e.g., WiFi, Bluetooth, or BLE), the UAV may utilize RSSI, geo-location information, camera data, or other data in the signals received over the short range communications to determine the location of the vehicle and connect with the vehicle. For example, the vehicle may broadcast the mapping, routing, or destination location data over a short range signal, as discuss above, instead of a distance using cellular signals or network communications with the UAV/service provider. Thus, the UAV may be located locally to the vehicle when the UAV determines that it will use the vehicle, and may therefore not be required to travel a long route to arrive at a meeting location at a time with the vehicle.

Once at the location at the specified time to meet the vehicle is determined and the UAV has arrived at the location, the UAV may be required to perform additional data capture, signal receipt, and/or data/signal processing at the location to correctly identify the vehicle and more particularly locate the vehicle. For example, multiple vehicles may be at or nearby the same geo-location, and/or the meeting geo-location may be defined over a small area where the vehicle may not be immediately identifiable by the UAV. In this regard, the UAV may utilize one or more additional components, such as a camera or other visual or optical capture device, to capture data of the vehicle at the location and identify the vehicle. If the vehicle includes a color, shape, light, license plate, or visible QR/bar-code, the UAV may identify the vehicle through such identifying characteristics and optical recognition and processing. The UAV may also utilize a communication component or transceiver to receive data communications from the vehicle and use the signal to identify a location of the vehicle, for example, through data from the vehicle (e.g., with a more accurate geo-location or coordinates) and/or through received signal strength indication (RSSI) processing of the power measurement in the received signals. Such data may be used to hone in on the specific location of the vehicle and connect with the vehicle.

The UAV may then connect with the vehicle once the UAV has adequately identified the vehicle and arrived at the specific location of the vehicle. The UAV may connect with the vehicle using the UAV latch and the vehicle latch discussed herein. The UAV may then travel with the vehicle for the set length of travel, such that the UAV power consumption is reduced and the range of the UAV is increased. In various embodiments, the UAV and the vehicle's device may interface directly to determine the geo-location of the vehicle/UAV. For example, a wired or wireless data interface of the vehicle may allow for the UAV's controller and the vehicle's device to communicate and exchange data while physically connected. The UAV and the vehicle may share additional data, such as location on the travel route of the vehicle, estimated time to arrival, etc. The UAV may also utilize the vehicle's device to communicate with a service provider to receive and transmit information, including an estimated travel time, new flight path or route for the UAV, an estimated delivery time, a location, or other data. Moreover, the UAV may communicate with other nearby vehicles' devices to receive data for travel information of other vehicles. The UAV may utilize a charging mechanism of the vehicle to recharge a power source or switch to a new power source as discussed herein. When the set length of travel has expired (e.g., the UAV detects that the UAV has arrived at a geo-location ending the travel with the vehicle), the UAV may disconnect from the vehicle through the use of the latching mechanism. Thus, the UAV may continue to detect a geo-location of the vehicle and UAV while connected, and disconnect when the vehicle reaches a certain point or begins to travel in a direction that no longer decreases power consumption of the UAV to reach the destination or takes the UAV further from the destination. After detection of the point in the travel route or the geo-location that no longer assists the UAV in reaching the endpoint is met, the UAV may then utilize the latches to disconnect from the vehicle and resume operation/flight. In order to reduce damage to the UAV, this may only occur in specific conditions, such as under a set speed of travel, which may be communicated to the UAV using the data interface with the vehicle's device.

In various embodiments, the vehicle may change course from a previous destination or route. The vehicle may also change direction of travel where a route or destination is not entered. The change may cause the UAV to use more power or take the UAV further from the destination location. The UAV may detect the change through a geo-location and mapping component when the vehicle deviates from the known route previously provided by the vehicle's device, or may receive the change from the vehicle's device through the data interface. If the UAV or a service provider detected the change in the vehicle's route or destination, the UAV may separate from the vehicle and resume normal operation. The UAV may also actively search for nearby vehicles after separating from the first vehicle that changes directions, and may find a second vehicle utilizing the aforementioned processes, which may include communications with the second vehicle's device and/or service provider.

The UAV may also separate from the first vehicle if the UAV receives information of another nearby vehicle that is more compatible with the UAV's route or destination, for example, by taking the UAV closer to the destination so that even less power is used by the UAV and the UAV may travel even further utilizing the second vehicle. The UAV or a service provider may determine the second vehicle during the use of the first vehicle for travel by the UAV. A route to meeting the second vehicle may be determined in similar fashion as that described above. Thus, the UAV and/or a service provider may continuously monitor data for vehicle's travel routes, and the UAV may detect nearby vehicles and change vehicles during travel toward the destination.

After finishing use of one or more vehicles for connection and travel with, the UAV may utilize operational components to execute a flight or travel route to the destination set for the UAV. For example, after using a vehicle to conserve power and extend the range of the UAV, the UAV may leave the vehicle and may begin rerouting and/or executing a route to the destination using the UAV's resources, including the UAV's power, controller, and flight or travel components. The UAV may travel to the endpoint and may then execute an operation at the endpoint, such as delivery of a package or data. The delivery location may correspond to a geo-location or a geo-fenced area for the UAV to end travel and operation. The geo-fencing may be established with one or more computing devices, including servers of the service provider and accessible by the devices at or nearby the location or other devices (e.g., operating devices for a UAV) so that the devices may be able to process location data and geo-fencing data to determine when the device is within or in proximity to the location. Once the UAV has performed the operation within the delivery location, the UAV may be repurposed at the delivery location, or may return to the start location using the aforementioned processes to piggyback on one or more vehicles.

Thus, the processes described herein may be used to extend an effective range of a UAV or other unmanned vehicle/system and allow performance and operation of the UAV over an extended range. This may assist the system in serving previously inaccessible areas due to power constrictions, signal and control deficiencies, or hazardous weather conditions that may affect UAV operation. Further, other devices and service providers may then take advantage of the benefits of UAV usage over an extended range.

Figure 1:
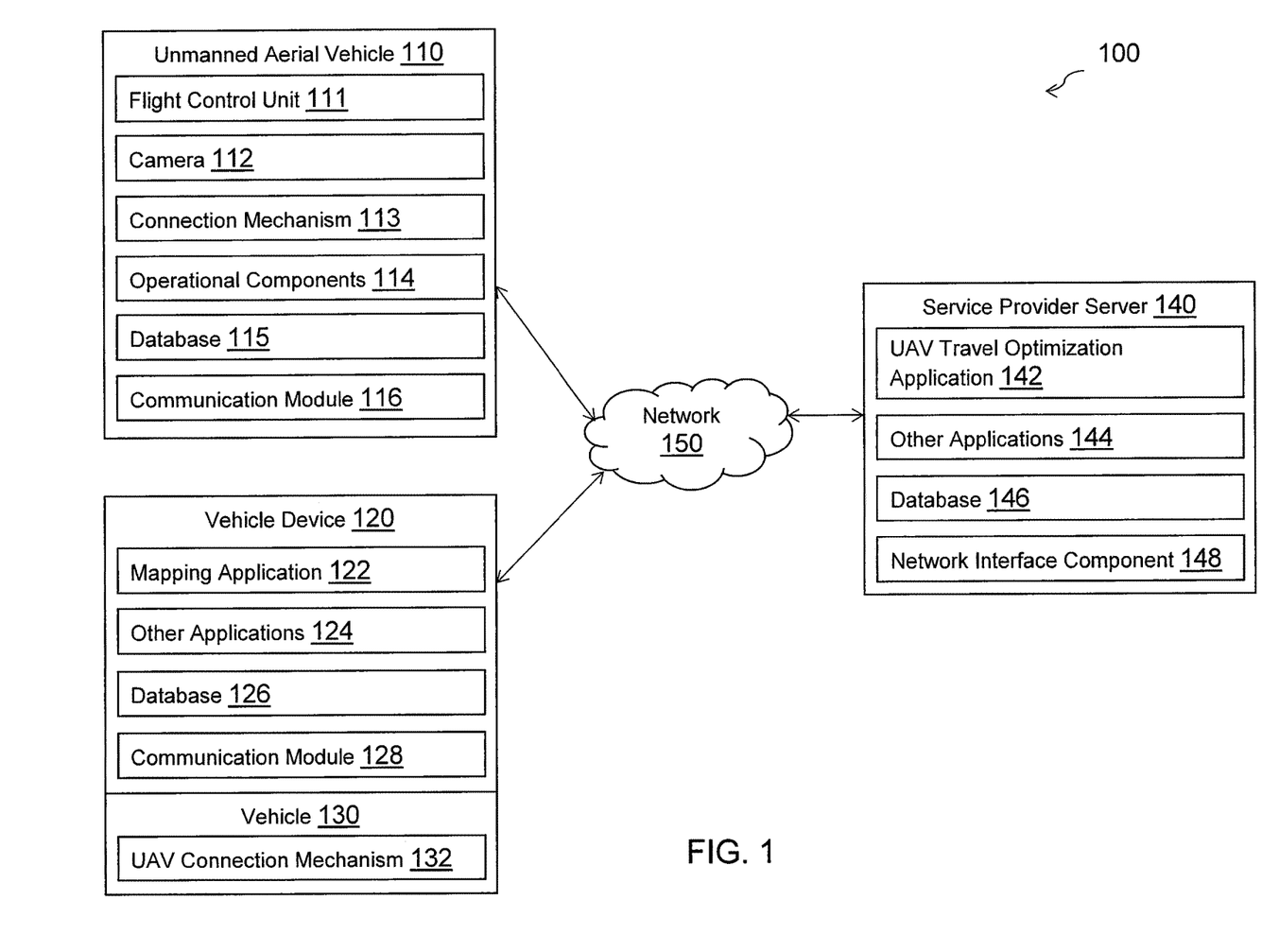
FIG. 1 is a block diagram of a networked system suitable for implementing the processes described herein, according to an embodiment.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes an unmanned aerial vehicle 110, a vehicle device 120, and a service provider server 140 in communication over a network 150. Unmanned aerial vehicle 110 may be operated over a range and to perform one or more operations autonomously or with remote control by service provider server 140 and/or user control. Unmanned aerial vehicle 110 may be required to travel outside of the normal operational range of unmanned aerial vehicle 110, such as a battery power or signal range of unmanned aerial vehicle 110. Based on a travel route of a vehicle 130 associated with vehicle device 120, unmanned aerial vehicle may physical connect to vehicle 130 and travel, or "piggy-back," on vehicle 130 for some distance to cover at least a portion of the range of coverage or operation requested for unmanned aerial vehicle 110. Vehicle device 120 may provide data for connection and travel between unmanned aerial vehicle 110 and vehicle 130, and in some embodiments, service provider server 140 may facilitate selection of vehicle 130 for piggybacking by unmanned aerial vehicle 110, locating vehicle 130 by unmanned aerial vehicle 110, and/or connection of unmanned aerial vehicle 110 to vehicle 130.

Unmanned aerial vehicle 110, vehicle device 120, and service provider server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Unmanned aerial vehicle 110 may correspond to a UAV or other unmanned vehicle, or may more generally correspond to a device that may be remotely controlled or provided with automated instructions. Unmanned aerial vehicle 110 includes a flight control unit 111, a camera 112, a connection mechanism 113, operational components 114, a database 115, and a communication module 116, which may be used to travel over a distance and perform one or more processes. In other embodiments, unmanned aerial vehicle 110 may include additional or different modules having specialized hardware and/or software as required.

Flight control unit 111 may include a controller or other operation control unit for unmanned or remote control of unmanned aerial vehicle 110. Flight control unit 111 of unmanned aerial vehicle 110 may be configured to facilitate navigation of unmanned aerial vehicle 110, e.g., take off, landing, navigation, driving, and/or flight of unmanned aerial vehicle 110. Such an operation module may include any appropriate avionics, control actuators, and/or other equipment, along with associated logic, circuitry, interfaces, memory, and/or code. Flight control unit 111 may include one or more appropriate components for use of features and equipment provided by an attached component and/or payload unit of unmanned aerial vehicle 110, including camera controllers, GPS location services, and the like. Additionally, flight control unit 111 or other operation module may include a controller that receives flight route information from one or more sources, including a memory and/or external controller (e.g., set instructions from a service provider and/or inflight navigation/instructions from an operator) that operates unmanned aerial vehicle 110. Further, a separate battery may be provided for control, so that unmanned aerial vehicle 110 may be able to communicate with an entity, in the case of main system power failure or other types of issues during operation and flight of unmanned aerial vehicle 110. In various embodiments, flight control unit 111 may also provide the processes for vehicle selection, meeting location determination, vehicle connection and disconnection, and destination routing that may be provided by service provider server 140. Flight control unit 111 may therefore be configured to interact with communication module 116 to send and receive data between vehicle device 120 for determination of vehicle 130 that may reduce power consumption and/or extend a range of unmanned aerial vehicle 110 by piggybacking on vehicle 130. However, in other embodiments, such data may be processed and determined partially or fully using service provider server 140 where flight control unit 111 may execute received flight instructions from service provider server 140. Flight control unit 111 may also use camera 112 and other components of unmanned aerial vehicle 110 for navigation (e.g., communication module 116 to send and receive signals and determine an RSSI for navigation and signal locating of vehicle 130).

Camera 112 corresponds to an optical device of unmanned aerial vehicle 110 enabling an unmanned aerial vehicle 110 to capture or record images, including still and/or video images, as well as associated image processing components and software for image processing and automated identification of objects, codes, or data in an image. Camera 112 may correspond to a digital camera on unmanned aerial vehicle 110, or may more generally correspond to any device capable of capturing or recording an image, video, or other digital media, including infrared imaging or other types imaging devices. Camera 112 may include various features, such as zoom, flash, focus correction, shutter speed controls, or other various features usable to capture one or more images of vehicle 130, as well as other nearby objects for use in navigation with flight control unit 111. Camera 112 may further output camera data for processing, including to flight control unit 111 for locating vehicle 130 and/or navigation of unmanned aerial vehicle 110, as well as to vehicle device 120 for authentication and identification when connecting to vehicle 130 and/or to service provider server 140 for navigation instructions.

Connection mechanism 113 of unmanned aerial vehicle 110 may correspond to a latching or connection component and mechanism configured to physically interface with a corresponding component of vehicle 130. Connection mechanism 113 may physically interface with the corresponding component of vehicle 130 to securely attach and hold unmanned aerial vehicle 110 to vehicle 130 on an external surface. Connection mechanism 113 may correspond to a mechanical, electrical, and/or magnetic attachment component and may provide a secure connection that may hold or otherwise secure unmanned aerial vehicle 110 to vehicle 130 to prevent disconnection and damage during travel with vehicle 130. Connection mechanism 113 may require minimal or no additional power to operate unmanned aerial vehicle 110, and may use outside pressure or air forces to assist in securing unmanned aerial vehicle 110 to vehicle 130. Connection mechanism 113 may also provide a wired connection to vehicle device 120 and/or vehicle 130 to provide power to unmanned aerial vehicle 110 for recharging and/or powering unmanned aerial vehicle 110. The wired connection may also provide for data exchange, including using cellular or other wireless communication capabilities of vehicle device 120.

In certain embodiments, operational components 114 of unmanned aerial vehicle 110 may include a payload unit that may be configured to implement features supported by unmanned aerial vehicle 110 and facilitate implementation of such features. The payload unit may include any equipment and associated logic, circuitry, interfaces, memory, and/or code. The payload unit may include a global positioning system (GPS) that provides a current position of unmanned aerial vehicle 110 (e.g., using three coordinates). The position information from the GPS, together with position information of devices in communication with unmanned aerial vehicle 110, may allow unmanned aerial vehicle 110 to execute a flight route as well as provide positioning information associated with a location. Depending on an application(s) of unmanned aerial vehicle 110, the payload unit may include one or more onboard sensors and/or data capture units, include a camera. By way of non-limiting example, sensors may include environmental sensors, such as temperature sensors, rain sensors, pressure sensors, humidity sensors, fog sensors, gas sensors, etc., or combination thereof; object/obstacle detection sensors, such as radar sensors, proximity sensors, motion detectors, etc., or combination thereof; imaging sensors (e.g., cameras); acoustic sensors, and/or other types of sensors, or combination thereof. Alternatively or in addition, the payload unit may include tools, actuators, robotic manipulators, etc., capable of performing an action, such as touching, grasping, delivering, and/or measuring objects. For delivery applications, the payload unit may include the object to be delivered, e.g. the object may be secured within a housing of unmanned aerial vehicle 110. The payload unit may be restricted in use by restriction on a location, and may require a usage right purchase by the user associated with unmanned aerial vehicle 110 to utilize without incurring a penalty.

Unmanned aerial vehicle 110 may further include database 115 stored to a transitory and/or non-transitory memory of unmanned aerial vehicle 110, which may store various applications and data and be utilized during execution of various modules of unmanned aerial vehicle 110. Thus, database 115 may include appropriate identifiers, such as identifiers used for device authentication or identification, which may be communicated as identifying unmanned aerial vehicle 110 to vehicle device 120 and/or service provider server 140. Database 115 may also store captured audio, video, or audiovisual content, and well as other captured data. Additionally, database 115 may also include stored routing data for unmanned aerial vehicle 114, such as a destination and/or a route for travel. In certain embodiments, database 115 may receive information used to identify vehicle device 120 and/or vehicle 130, as well as meet and connect with vehicle 130.

Communication module 116 may include one or more radio transceivers (e.g., that include antennas) along with associated logic, circuitry, interfaces, memory, and/or code that enable communications, via wireless interfaces and using the radio transceivers. In FIG. 1, the radio transceivers of unmanned aerial vehicle 110 include an antenna that may include suitable logic, circuitry, interfaces, memory, and/or code that enable wired communications. In this regard, unmanned aerial vehicle 110 may be configured to interface with a wired network, such as via an Ethernet interface, power-line modem, Digital Subscriber Line (DSL) modem, Public Switched Telephone Network (PSTN) modem, cable modem, and/or other appropriate components for wired communication. A wired link may be implemented with a power-line cable, coaxial cable, fiber-optic cable, or other cable or wires that support corresponding wired network technologies. For example, unmanned aerial vehicle 110 may utilize wired connections when at or near ground level or connected with vehicle 130, such as a wired connection between unmanned aerial vehicle 110 and vehicle device 120 for facilitating testing and/or calibration/setup. In other embodiments, the communication module 116 may send and/or receive information, including flight paths, signals associated with a location, media data, and/or restrictions/usage rights information or associated processes, over a cellular technology signal/network (e.g., 3G, 4G, 5G, and/or other 3GPP-based cellular network). Thus, unmanned aerial vehicle 110 may wirelessly communicate with other devices using wireless standards, such as the Institute of Electrical and Electronics Engineers (IEEE) 802.11 standard, Bluetooth® standard, ZigBee® standard, and/or other wireless standards; cellular standards, such as 3G, 4G, 4G LTE, 5G, and/or other cellular standards; infrared-based communication; optical-based communications; and/or other appropriate communication standards and/or protocols. In some cases, unmanned aerial vehicle 110 may be configured to communicate with another device using a proprietary wireless communication protocol and interface.

Vehicle device 120 may be implemented as a communication device that may utilize appropriate hardware and software configured for wired and/or wireless communication with unmanned aerial vehicle 110, viewer device 150, and/or service provider server 140. For example, in one embodiment, vehicle device 120 may be implemented as a console device or onboard computing device within vehicle 130. Vehicle device 120 may also correspond to a device used by a user inside vehicle 130, such as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data. Although only one device is shown, a plurality of devices may function similarly.

Vehicle device 120 of FIG. 1 contains a mapping application 122, other applications 124, a database 126, and a communication module 128. Remote vehicle application 130, transaction service application 140, and other applications 124 may correspond to executable processes, procedures, and/or applications with associated hardware. In other embodiments, vehicle device 120 may include additional or different modules having specialized hardware and/or software as required.

Mapping application 122 may correspond to one or more processes to execute software of vehicle device 120 to provide travel route determination and display of one or more travel routes between two or more endpoints to a user, as well as output the travel route to unmanned aerial vehicle 110. In this regard, mapping application 122 may correspond to specialized hardware and/or software utilized by vehicle device 120 to provide map features to user 102 through one or more instances or displays of application interfaces output using a graphical user interface (GUI) of vehicle device 120. Mapping application 122 may receive a destination location requested by the user and output a travel route to the destination location. For example, a user in vehicle 130 may enter a destination endpoint to mapping application 122, which may correspond to a desired endpoint of travel. In various embodiments, the user may also enter a starting location. However, mapping application 122 may also determine the starting location from a current location of vehicle device 120, which may be determined by a GPS locator and associated application of vehicle device 120 and/or vehicle 130 or other location detection system, as discussed herein. Mapping application 122 may also receive further updates to a current location of vehicle 130 through the GPS or other location detection system. Mapping application 122 may determine a travel route from the starting/current point and the destination endpoint for user 102 using service provider server 120, for example, based on stored or available maps for locations corresponding to the starting/current point and/or the destination endpoint.

Once the travel route is determined and/or received, mapping application 122 may output the travel route on a map interface displayed using a graphical user interface (GUI) and output display of vehicle device 120. Mapping application 122 may also receive traffic information, weather information, and/or other travel parameters from an online resource, which may be displayed with the travel route. The travel route output in the map interface may include direction, a graphic for display on a visual map, and/or other information used to direct a user to the destination location from user 102's starting/current location, which may be displayed using an interface of mapping application 122 and/or output using an audio device, such as speakers of vehicle device 120. In various embodiments, mapping application 122 may further receive data for an executable process to re-route or re-process travel data (e.g., location endpoints for travel between/to) and/or change a route. User 102 may utilize an interface of mapping application 122 and/or one or more input devices to select the process to reroute or change the route, which may cause recalculation and determination of a new travel route. Additionally, mapping application 122 may output data for the travel route to unmanned aerial vehicle 110 and/or service provider server 140 for determination of how unmanned aerial vehicle 110 may connect with and use vehicle 130.

In various embodiments, vehicle device 120 includes other applications 124 as may be desired in particular embodiments to provide features to vehicle device 120. For example, other applications 124 may include security applications for implementing client-side security features, programmatic client applications for interfacing with appropriate application programming interfaces (APIs) over network 150, or other types of applications. Other applications 124 may also include email, texting, voice and IM applications that allow a user to send and receive emails, calls, texts, and other notifications through network 150. In various embodiments, other applications 124 may include financial applications, such as banking applications. Other applications 124 may also include other location detection applications, which may be used to determine a location for the user, such as a mapping, compass, and/or GPS application, which can include a specialized GPS receiver that obtains location information for vehicle device 120 and processes the location information to determine a location of vehicle device 120 and the user. Other applications may include social networking applications, media viewing, and/or merchant applications. Other applications 124 may include device interface applications and other display modules that may receive input from the user and/or output information to the user. For example, other applications 124 may contain software programs, executable by a processor, including a graphical user interface (GUI) configured to provide an interface to the user. Other applications 124 may therefore use devices of vehicle device 120, such as display devices capable of displaying information to users and other output devices, including speakers.

Vehicle device 120 may further include database 126 stored to a transitory and/or non-transitory memory of vehicle device 120, which may store various applications and data and be utilized during execution of various modules of vehicle device 120. Thus, database 126 may include, for example, identifiers such as operating system registry entries, cookies associated with transaction service application 140 and/or other applications 124, identifiers associated with hardware of vehicle device 120, or other appropriate identifiers, such as identifiers used for payment/user/device authentication or identification, which may be communicated as identifying vehicle device 120 to service provider server 140. In various embodiments, database 126 may 8 also store routing information.

Vehicle device 120 includes at least one communication module 128 adapted to communicate with unmanned aerial vehicle 110 and/or service provider server 140. In various embodiments, communication module 128 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 128 may communicate directly with nearby devices (e.g., viewer device 150) using short range communications, such as Bluetooth Low Energy, LTE Direct, WiFi, radio frequency, infrared, Bluetooth, and near field communications.

Vehicle 130 may correspond to a transportation system or means that may be used to connect with an unmanned aerial vehicle and "carry" the unmanned aerial vehicle over at least a partial travel route of the unmanned aerial vehicle. For example, vehicle 130 may correspond to a car, bus, truck, or other land based vehicle that may be driven by a user. Vehicle 130 may also correspond to a train, boat, plane, or other types of vehicle that is capable of carrying unmanned aerial vehicle 110 over a least a portion of the UAV travel route. In certain embodiments, vehicle 130 may also correspond to a driverless car or automated/self-driving vehicle. In this regard, vehicle 130 may travel over a route and accept unmanned aerial vehicle 110 for connection so that unmanned aerial vehicle 110 may utilize vehicle 130 for travel. Vehicle 130 may include a UAV connection mechanism 132, which may provide a similar and corresponding latching or connection component and mechanism as connection mechanism 113 on an external surface, such as a roof, trunk area, cargo compartment, or other external area of the vehicle. UAV connection mechanism 132 may come preinstalled or manufactured on the vehicle, or may be installable utilizing various components, such as a physical kit having one or more components for installation on the external surface of the vehicle. In certain embodiments, UAV connection mechanism 132 may instead be provided as an internal cargo compartment. UAV connection mechanism 132 may physically interface with the vehicle latch to provide a securing mechanism that holds the UAV in place on the external surface of vehicle 130 mechanically, electrically, and/or magnetically.

UAV connection mechanism 132 may also include additional components, such as a wired and/or wireless transceiver. A wireless transceiver may be used to communicate with unmanned aerial vehicle 110 over distance, including through cellular channels, networks, and/or direct communications over the aforementioned communication protocols. Once latched onto vehicle 130 and connected, a wired connection may be used for more secure and reliable communications. UAV connection mechanism 132 may also provide a power and/or charging mechanism for unmanned aerial vehicle 110, which may include a mechanical or magnetic connection that allows for wired and/or wireless inductive charging. UAV connection mechanism 132 may include a visual identification component, which may allow unmanned aerial vehicle 110 to identify and locate vehicle 130, such as a QR code or barcode. The visual indicator may also correspond to a dynamic output, including a light that emits a pattern of outputs and/or colors to identify vehicle 130 and/or a changeable QR or barcode having encoded data, for example, through an e-ink display, LCD panel, or other output display.

Service provider server 140 may be maintained, for example, by an online service provider, which may provide routing information to unmanned aerial vehicle 110 for connection with vehicle 130. In this regard, service provider server 140 includes one or more processing applications which may be configured to interact with unmanned aerial vehicle 110, vehicle device 120, and/or another device/ server to facilitate recommendation of items between users based on data captured by one of the user, as well as processing transactions for the items. In one example, service provider server 140 may be provided by PAYPAL®, Inc. of San Jose, Calif., USA. However, in other embodiments, service provider server 140 may be maintained by or include another type of service provider, which may provide connection services to a plurality of users.

Service provider server 140 of FIG. 1 includes a UAV travel optimization application 142, other applications 144, a database 146, and a network interface component 148. UAV travel optimization application 142 and other applications 144 may correspond to executable processes, procedures, and/or applications with associated hardware. In other embodiments, service provider server 140 may include additional or different modules having specialized hardware and/or software as required.

UAV travel optimization application 142 may correspond to one or more processes to execute software modules and associated specialized hardware of service provider server 140 to determine a location of unmanned aerial vehicle 110 and/or vehicle 130, and provide routing information for unmanned aerial vehicle 110 to locate vehicle 130 and utilize vehicle 130 for travel towards a destination. In this regard, UAV travel optimization application 142 may correspond to specialized hardware and/or software to first receive, detect, or otherwise determine a location of unmanned aerial vehicle 110, as well as a destination location for unmanned aerial vehicle 110. The location may be determined from received GPS coordinates or other data from a mapping or location detection system. After determination of the location, UAV travel optimization application 142 may also determine a destination location and/or a route to the destination location, which may be communicated to unmanned aerial vehicle 110.

UAV travel optimization application 142 may also receive travel information for one or more vehicles, such as vehicle 130. UAV travel optimization application 142 may receive routing information for vehicle 130 from vehicle device 120. UAV travel optimization application 142 may determine that vehicle 130 covers a part or portion of travel needed to reach the destination location by vehicle 130, thereby increasing the effective range of unmanned aerial vehicle 110. UAV travel optimization application 142 may determine a meeting location for unmanned aerial vehicle 110, which may correspond to a geo-location and a time for meeting between unmanned aerial vehicle 120 and vehicle 130. The meeting location may be communicated to unmanned aerial vehicle 110 and/or vehicle device 120 for connection of unmanned aerial vehicle 110 to vehicle 130. Additionally, UAV travel optimization application 142 may also determine a separation point, location, and/or time for unmanned aerial vehicle 110 to separate from vehicle 130. After separation, UAV travel optimization application 142 may also provide a route to the destination location of unmanned aerial vehicle 110. However, in other embodiments, the processes of UAV travel optimization application 142 to provide information that causes unmanned aerial vehicle 110 to use vehicle 130 for transportation or piggybacking may be performed by unmanned aerial vehicle 110 directly.

In various embodiments, service provider server 140 includes other applications 144 as may be desired in particular embodiments to provide features to service provider server 140. For example, other applications 144 may include security applications for implementing server-side security features, programmatic client applications for interfacing with appropriate application programming interfaces (APIs) over network 150, or other types of applications. Other applications 144 may contain software programs, executable by a processor, including a graphical user interface (GUI), configured to provide an interface to the user when accessing service provider server 140, where the user or other users may interact with the GUI to more easily view and communicate information. In various embodiments, other applications 144 may include connection and/or communication applications, which may be utilized to communicate information to over network 150.

Additionally, service provider server 140 includes database 146. Database 146 may store various identifiers associated with unmanned aerial vehicle 110 and/or vehicle device 120. Data for destinations and/or travel routes of unmanned aerial vehicle 110 and/or vehicle device 120 may be stored to database 146. Additional information for service provider server, unmanned aerial vehicle 110 and/or vehicle device 120 identification, such as a QR code and/or other data may be stored to database 146.

In various embodiments, service provider server 140 includes at least one network interface component 148 adapted to communicate unmanned aerial vehicle 110 and/or vehicle device 120 over network 150. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
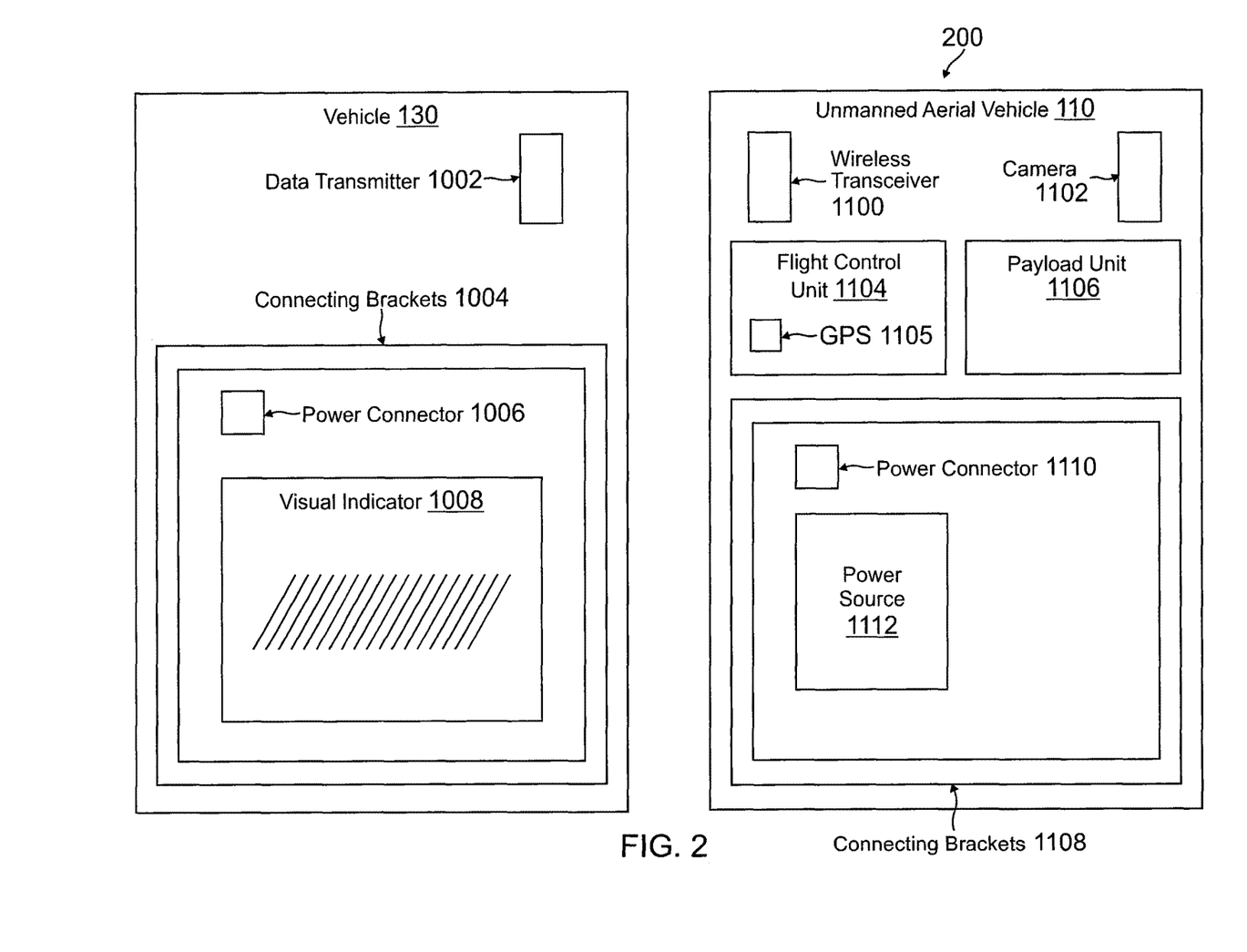
FIG. 2 is a block diagram of physical and data interfaces between a drone and a vehicle for enhanced distance coverage, according to an embodiment.

FIG. 2 is a block diagram of physical and data interfaces of a drone and a vehicle used to facilitate operations discussed herein for enhanced distance coverage, according to an embodiment. Environment 200 of FIG. 2 includes unmanned aerial vehicle 110 and vehicle 130 that may correspond to a portion or all of the described processes herein discussed in reference to system 100 of FIG. 1.

In environment 200, vehicle 130 may include components and structures used to physically interface and connect with unmanned aerial vehicle 110, as well as share and exchange data with unmanned aerial vehicle 110. In this regard, vehicle 130 includes a data transmitter 1002, which may be used to communicate data with unmanned aerial vehicle 110. Data transmitter 1002 may wireless connect with unmanned aerial vehicle 110 for the exchange of data, including providing a travel route for vehicle 130 to unmanned aerial vehicle 110 for processing. Data transmitter 1002 may therefore work over a desired or predetermined range, and may utilize one or more communication protocols and channels, including cellular networks as well as short range wireless communications. Data transmitter 1002 may also include a wired communication component. Vehicle 130 includes connecting brackets 1004 for connection with unmanned aerial vehicle 110, where connecting brackets 1004 may include mechanical, electrical, and/or magnetic connection components that may secure unmanned aerial vehicle 110 to vehicle 130. Connecting brackets 1004 may be included on vehicle 130 during manufacturing of vehicle 130, or may be installable on vehicle 130 using an after-market kit. Connecting brackets 1004 may therefore include additional components used with unmanned aerial vehicle 110, such as a power connector 1006 to provide power and charging capabilities to unmanned aerial vehicle 110 and a visual indicator 1008 to assist unmanned aerial vehicle 110 in identifying vehicle 130 and connecting to vehicle 130. Visual indicator 1008 may include a bar code or QR code that assists unmanned aerial vehicle in identifying vehicle 130.

Unmanned aerial vehicle 110 in environment 200 includes components used to interact with and connect to vehicle 130. In this regard, unmanned aerial vehicle 110 includes a wireless transceiver 1100 and a camera 1102, which may be utilized to identify vehicle 130 for use and navigation to vehicle 130 for connection. Wireless transceiver 1100 may similarly send and receive data with data transmitter 1002 of vehicle 130, which may also use cellular networks as well as short range wireless communications. Wireless transceiver 1100 may also send and receive data with a service provider for use in determining a route for vehicle 130 and where to meet vehicle 130 to connect with vehicle 130. Camera 1102 of unmanned aerial vehicle 110 may be used to navigate unmanned aerial vehicle 110 by assisting in avoiding objects and recognizing landmarks and visual indicator 1008 of vehicle 130.

Unmanned aerial vehicle 110 further includes a flight control unit 1104 having a GPS device 1105, which may control unmanned aerial vehicle 110 to travel to a location and/or connect with vehicle 110. Flight control unit 1104 may therefore include determine or communicate data for a destination, as well as any timing requirements to arrive at the location. Flight control unit 1104 may therefore use wireless transceiver to receive navigation instructions, and may also navigate using camera 1102. Unmanned aerial vehicle 110 includes a payload unit 1106, which may be used to perform operations of unmanned aerial vehicle 110, such as delivering a package held by unmanned aerial vehicle 110. In order to piggyback on vehicle 130 and travel with vehicle 130, unmanned aerial vehicle 110 includes connecting brackets 1108 that may similarly physically interface with vehicle 130 to hold unmanned aerial vehicle 110 to vehicle 130 without requiring power or using minimal power. Unmanned aerial vehicle may further include a power connector 1110 for a power source 1112 that may be used to charge power source 1112 while unmanned aerial vehicle 110 is connected to vehicle 130.

Figure 3:
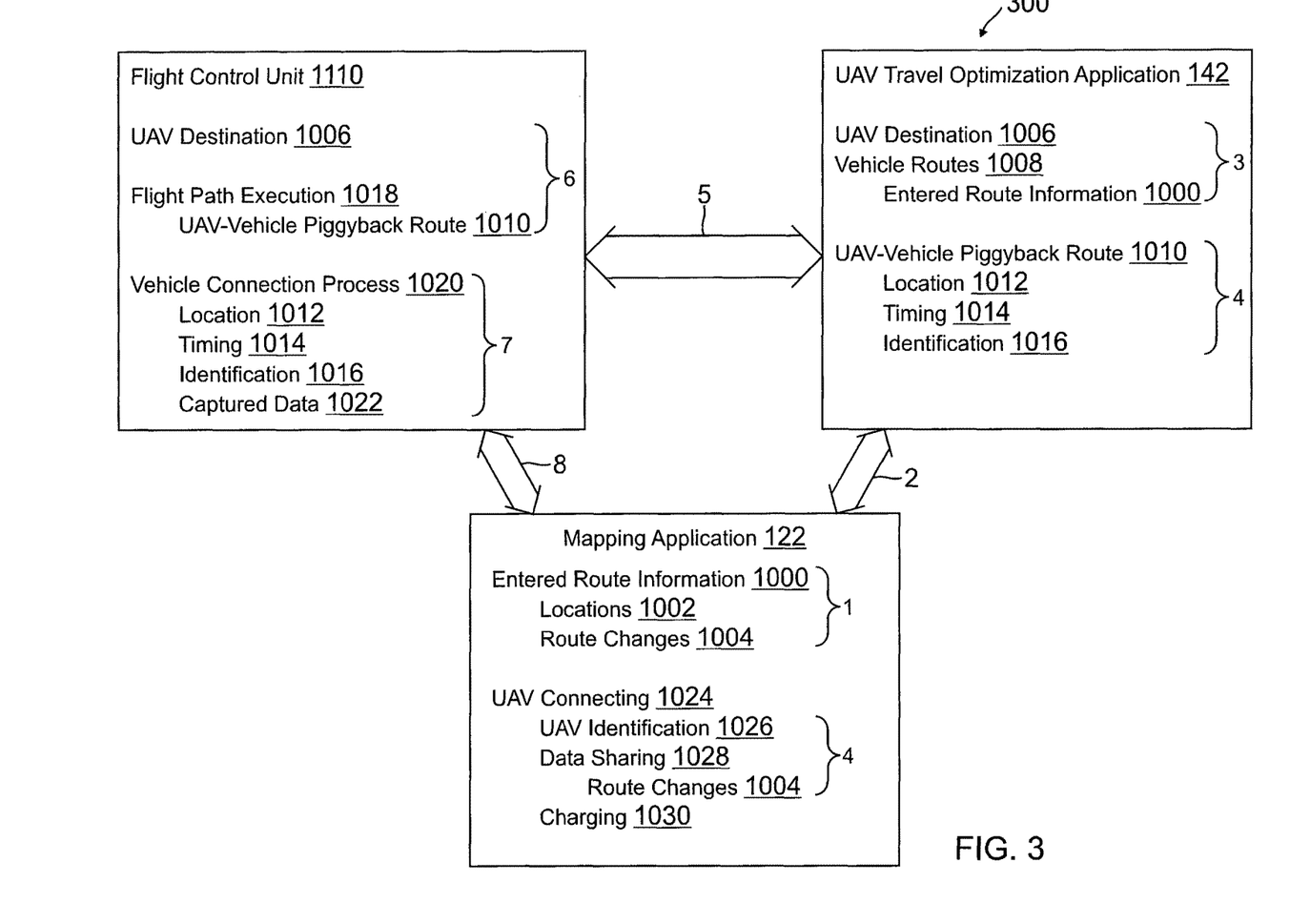
FIG. 3 is an exemplary system environment showing communications between a drone, a device for a vehicle, and a service provider server for enhanced distance coverage, according to an embodiment.

FIG. 3 is an exemplary system environment showing communications between a drone, a device for a vehicle carrying the drone, and a service provider server for enabling enhanced distance coverage of the drone, according to an embodiment. FIG. 3 includes flight control until 111, mapping application 122, and UAV travel optimization application 142 discussed in reference to system 100 of FIG. 1.

Mapping application 122 of a vehicle's device may first receive input data for entered route information 1000 having location 1002 of travel and route changes 1004 while traveling at step 1. Mapping application 122 may output the data for entered route information 1000 to UAV travel optimization application 142 executed by a service provider. UAV travel optimization application 142 may utilize UAV destination 1006 for a UAV controlled by flight control unit 111 with vehicle routes 1008, such as entered route information 1000, at step 3 to determine whether the vehicle for mapping application 122 may be used by the UAV for piggybacking. Thus, at step 4, a UAV-vehicle piggyback route 1010 may be determined, where the UAV-vehicle piggyback route 1010 may correspond to a route for the UAV to use to navigate to the vehicle and connect with the vehicle for piggybacking over a distance.

At step 5, UAV-vehicle piggyback route 1010 may be output by UAV travel optimization application 142 to flight control unit 111 to cause navigation of the UAV to meet the vehicle and utilize the vehicle. At step 6, flight control unit 111 of the UAV may utilize UAV destination 1006 with UAV-vehicle piggyback route 1010 to perform a flight path execution 1018 of UAV-vehicle piggyback route 1010 and utilize the vehicle associated with mapping application 122. After flight path execution 1018, flight control unit 111 may then control the UAV to perform a vehicle connection process 1020 at step 7. Vehicle connection process 1020 may include a location 1012 to connect with the vehicle, a timing 1014 for connecting to the vehicle, identification 1016 of the vehicle, and captured data 1022 to identify the vehicle using identification 1016. After connecting with the vehicle, at step 8 flight control unit 111 may also interface directly with mapping application 122 to exchange additional data. For example, flight control unit 111 and mapping application 122 may exchange data at step 9 for UAV connection 1024, which may include a UAV identification 1026, data sharing 1028 for route changes 1004, and charging 1030 provided to the UAV.

Figure 4:
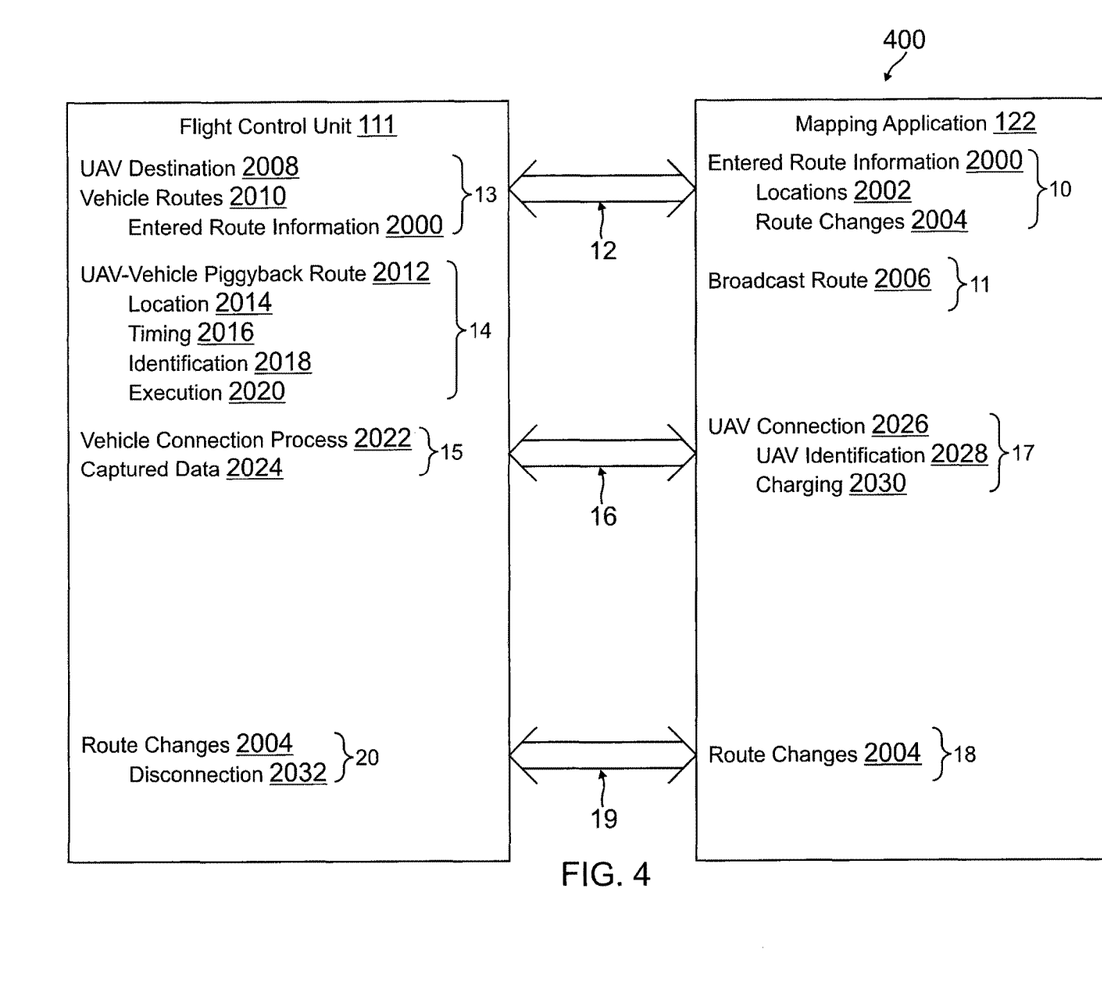
FIG. 4 is an exemplary system environment showing communications between a drone and a device for a vehicle for enhanced distance coverage, according to an embodiment.

FIG. 4 is an exemplary system environment showing communications between a drone and a device for a vehicle for enhanced distance coverage, according to an embodiment. FIG. 4 includes flight control until 111 and mapping application 122, discussed in reference to system 100 of FIG. 1.

In environment 400, a UAV and a vehicle's device may interface directly to perform piggybacking of the UAV on the vehicle without requiring a service provider, for example, through broadcasts by the UAV and the vehicle, in contrast to FIG. 3. In this regard, at a step 10 mapping application 122 may receive input for entered route information 2000 having locations 2002 and route changes 2004. Mapping application 122 may perform a broadcast at step 11 of broadcast route 2006 taken by the vehicle associated with mapping application 122. Thus, at step 12 the broadcast may be received by flight control unit 111. Flight control unit 111 may utilize the broadcast at step 13 with UAV destination 2008 to determine whether there is a vehicle that may be used by the UAV to piggyback over a desired distance or route. For example, vehicle routes 2010 may include entered route information 2000 that are processed at step 13. Thus, at step 14, UAV-vehicle piggyback route 2012 may be determined by flight control unit 111 using broadcast route 2006 from mapping application 122 and UAV destination 2008. UAV-vehicle piggyback route 2012 may include a location 2014 and timing 2016 for meeting the vehicle, as well as identification 2018 of the vehicle. At step 14, UAV-vehicle piggyback route 2012 may then be associated with an execution 2020 of the route to travel to the location 2014 based on timing 2016.

Flight control unit 111 may perform a vehicle connection process 2022 at step 15, which may include captured data 2024 for connection with the vehicle. At step 16, flight control unit 111 may interface with mapping application 122 after the UAV and vehicle connect. Thus, a UAV connection 2026 may be performed at step 17, which may include a UAV identification 2028 provided to mapping application 122, and a charging 2030 for the UAV. At step 18, mapping application 122 may detect route changes 2004, which may be communicated to flight control unit 111 at step 19. Flight control unit 111 may receive route changes 2004 at step 20. In response, flight control unit 111 may determine whether disconnection 2032 is necessary based on route changes 2004.

Figure 5:
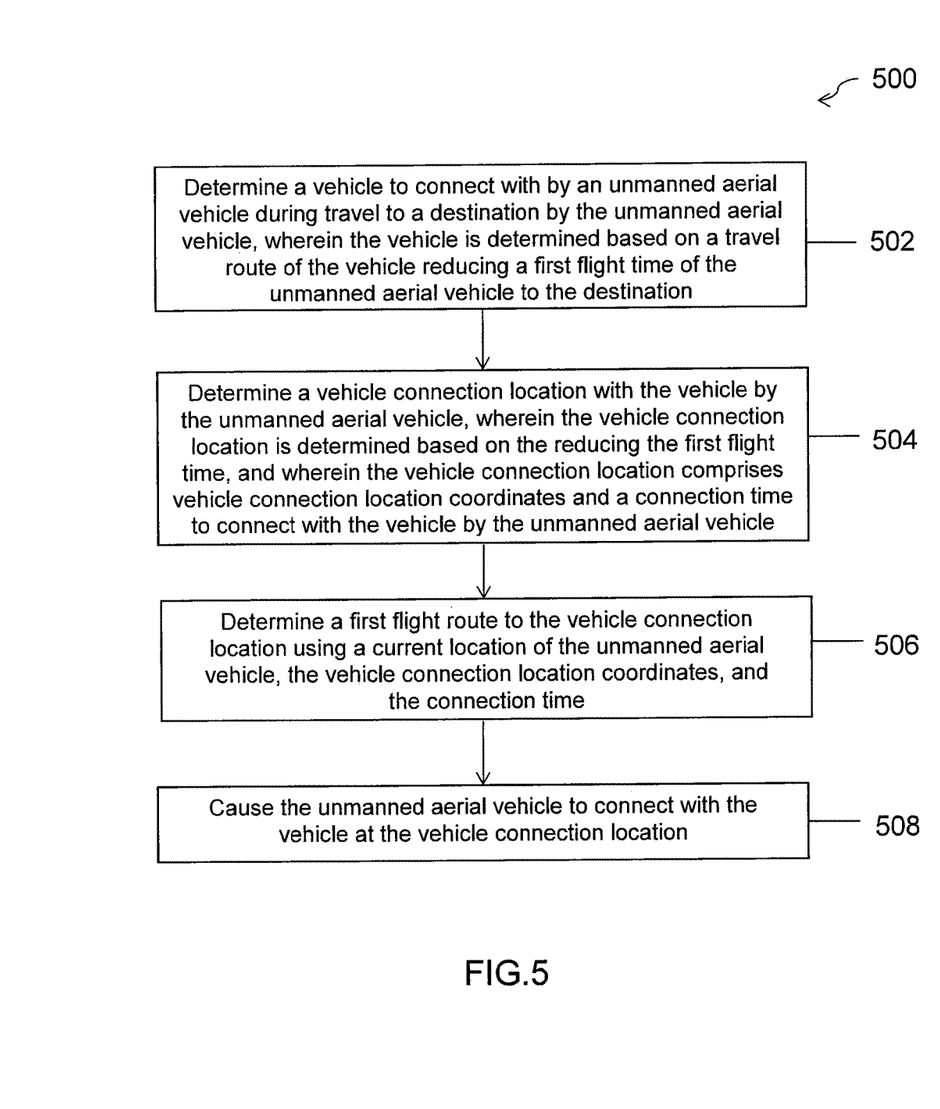
FIG. 5 is a flowchart of an exemplary process for use of a drone physical and data interface for enhanced distance coverage, according to an embodiment.

FIG. 5 is a flowchart of an exemplary process for use of a drone physical and data interface, according to an embodiment. Note that one or more steps, processes, and methods described herein may be omitted, performed in a different sequence, or combined as desired or appropriate.

At step 502, a vehicle to connect with by an unmanned aerial vehicle during travel to a destination by the unmanned aerial vehicle is determined, wherein the vehicle is determined based on a travel route of the vehicle reducing a first flight or travel time of the unmanned aerial vehicle to the destination. The vehicle may broadcast a signal indicating availability for the use of the vehicle by the unmanned aerial vehicle, wherein one of a service provider or the unmanned aerial vehicle detects the signal. A vehicle connection location with the vehicle by the unmanned aerial vehicle is determined, at step 504, wherein the vehicle connection location is determined based on the reducing the first flight time, and wherein the vehicle connection location comprises vehicle connection location coordinates and a connection time to connect with the vehicle by the unmanned aerial vehicle.

At step 506, a first flight route to the vehicle connection location using a current location of the unmanned aerial vehicle, the vehicle connection location coordinates, and the connection time are determined. Determining the vehicle, the vehicle connection location, and the first flight route may be performed prior to beginning flight to the destination location by the unmanned aerial vehicle with a delivery package or may be performed during the flight. It may also be required that the unmanned aerial vehicle captures an image of the vehicle and performs an authentication of the vehicle using the image. At step 508, the unmanned aerial vehicle is caused to connect with the vehicle at the vehicle connection location. A change in direction by the vehicle on the travel route of the vehicle may be determined and it may further be determined that the change in direction increases at least one of the first flight time and a second flight time of the unmanned aerial vehicle from a present location of the vehicle at the time of the change in directions. Thus, the unmanned aerial vehicle may be caused to disconnect from the vehicle in response to the determination. In response to causing the unmanned aerial vehicle to disconnect from the vehicle at a disconnection location, a second flight route from the disconnection location to the destination location may be determined.

In various embodiments, a change to the travel route may be received, wherein the change increases the power consumption of the unmanned aerial vehicle to the destination of the unmanned aerial vehicle from the point. The unmanned aerial vehicle may be caused to disconnect from the vehicle in response to the change. In response to disconnecting from the vehicle at a disconnection location, another vehicle on another travel route that is accessible to the unmanned aerial vehicle from the disconnection location is determined, wherein meeting and using the second vehicle places the unmanned aerial vehicle closer to the destination location from the disconnection location. The unmanned aerial vehicle may then be caused to connect with the other vehicle.

The UAV system may include a latching mechanism configured to latch the unmanned aerial vehicle to the vehicle at the vehicle connection location, wherein the causing the unmanned aerial vehicle to connect with the vehicle uses the latching mechanism. The latching mechanism may comprise a recharging component for the unmanned aerial vehicle. The UAV system may also include a camera, wherein prior to the causing the unmanned aerial vehicle to connect to the vehicle, the UAV system may detect the vehicle using the camera and navigate the unmanned aerial vehicle to the vehicle based on the detecting the vehicle. The camera may detect the vehicle using at least one of a QR code or barcode place on top of the vehicle, a light signal output by the vehicle, a shape of the vehicle, a license plate of the vehicle, or a color of the vehicle.

The UAV system may further include a wireless transceiver, wherein prior to the causing the unmanned aerial vehicle to connect to the vehicle, the UAV system may communicate with a device associated with the vehicle using the wireless transceiver and navigate the unmanned aerial vehicle to the vehicle based on the communicating with the device. The wireless transceiver may communicate with the device through wireless signals, wherein navigating the unmanned aerial vehicle to the vehicle uses at least a received signal strength indicator (RSSI) for the signals. The wireless transceiver may comprise at least one of a WiFi, 3G, 4G, 5G, Bluetooth, or Bluetooth Low Energy transceiver.

Therefore, using embodiments described herein, a drone may be able to extend its operational or travel range and/or reduce power consumption by utilizing one or more different transportation vehicles to carry the drone at least a partial distance along a travel route to a desired destination.

Figure 6:
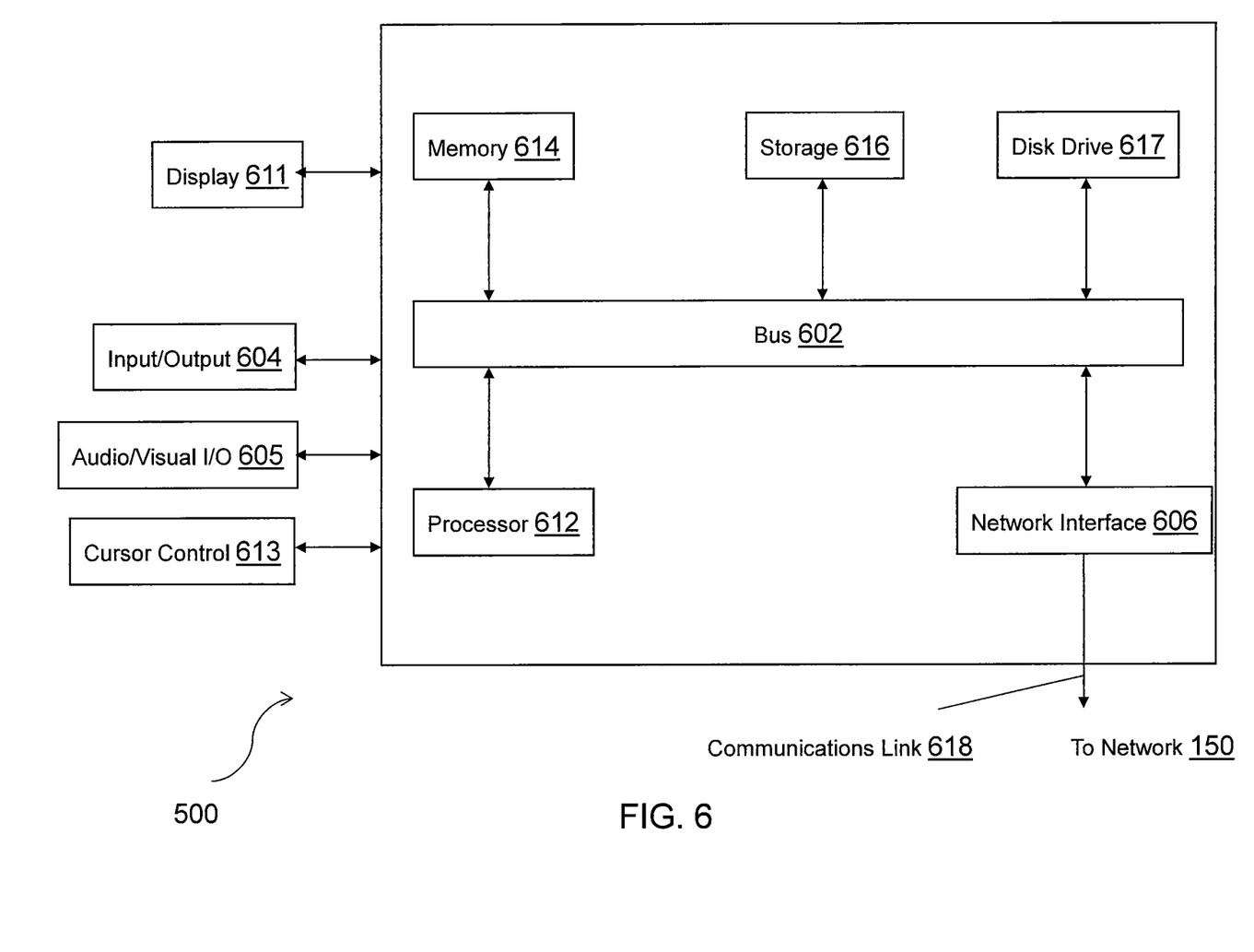
FIG. 6 is a block diagram of a computer system suitable for implementing one or more components in FIG. 1, according to an embodiment.

FIG. 6 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons, image, or links, and/or moving one or more images, etc., and sends a corresponding signal to bus 602. I/O component 604 may also include an output component, such as a display 611 and a cursor control 613 (such as a keyboard, keypad, mouse, etc.). An optional audio input/output component 605 may also be included to allow a user to use voice for inputting information by converting audio signals. Audio I/O component 605 may allow the user to hear audio. A transceiver or network interface 606 transmits and receives signals between computer system 600 and other devices, such as another communication device, service device, or a service provider server via network 150. In one embodiment, the transmission is wireless, although other transmission mediums and methods may also be suitable. One or more processors 612, which can be a micro-controller, digital signal processor (DSP), or other processing component, processes these various signals, such as for display on computer system 600 or transmission to other devices via a communication link 618. Processor(s) 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor(s) 612 and other components by executing one or more sequences of instructions contained in system memory component 614. Logic may be encoded in a computer readable medium, which may refer to any medium that participates in providing instructions to processor(s) 612 for execution. Such a medium may take many forms, including but not limited to, non-volatile media, volatile media, and transmission media. In various embodiments, non-volatile media includes optical or magnetic disks, volatile media includes dynamic memory, such as system memory component 614, and transmission media includes coaxial cables, copper wire, and fiber optics, including wires that comprise bus 602. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. An unmanned aerial vehicle comprising:
a non-transitory memory storing instructions; and
one or more hardware processors couple to the non-transitory memory and configured to read the instructions from the non-transitory memory to cause the unmanned aerial vehicle to perform operations comprising:
determining a vehicle to connect with by the unmanned aerial vehicle during travel to a destination by the unmanned aerial vehicle, wherein the vehicle is determined based on a travel route of the vehicle, a location of the unmanned aerial vehicle, and the destination;
determining a vehicle connection location with the vehicle by the unmanned aerial vehicle, wherein the vehicle connection location is determined based on the location of the vehicle, the travel route of the vehicle, the location of the unmanned aerial vehicle, and the destination, and wherein the vehicle connection location comprises vehicle connection location coordinates and a connection time to connect with the vehicle by the unmanned aerial vehicle;
determining a first travel route to the vehicle connection location using a current location of the unmanned aerial vehicle, the vehicle connection location coordinates, and the connection time;
connecting with the vehicle at the vehicle connection location in response to the connecting with the vehicle, connecting with a device of the vehicle; and
utilizing, based on the connecting with the device, a data processing service of the device during the connecting with the vehicle by the unmanned aerial vehicle.

2. The unmanned aerial vehicle of claim 1, wherein the operations further comprise:
determining a change in the travel route of the vehicle; and
causing the unmanned aerial vehicle to disconnect from the vehicle.

3. The unmanned aerial vehicle of claim 2, wherein the operations further comprise:
in response to causing the unmanned aerial vehicle to disconnect from the vehicle at a disconnection location, determining a second travel route from the disconnection location to the destination.

4. The unmanned aerial vehicle of claim 1, wherein the determining the vehicle, the vehicle connection location, and/or the first travel route is performed prior to beginning a flight to the destination by the unmanned aerial vehicle or is performed during the flight.

5. The unmanned aerial vehicle of claim 1, wherein the destination is a delivery location of a package or data from the unmanned aerial vehicle.

6. The unmanned aerial vehicle of claim 1, further comprising:
a latching mechanism configured to latch the unmanned aerial vehicle to the vehicle at the vehicle connection location, wherein the connecting with the vehicle uses the latching mechanism.

7. The unmanned aerial vehicle of claim 6, wherein the latching mechanism comprises a recharging component for the unmanned aerial vehicle.

8. The unmanned aerial vehicle of claim 1, further comprising:
a camera;
wherein prior to the connecting with the vehicle, the operations further comprise:
detecting the vehicle using the camera; and
navigating the unmanned aerial vehicle to the vehicle based on the detecting the vehicle.

9. The unmanned aerial vehicle of claim 8, wherein the camera detects the vehicle using at least one of a QR code or a barcode on the vehicle, a light signal output by the vehicle, a shape of the vehicle, a license plate of the vehicle, or a color of the vehicle.

10. The unmanned aerial vehicle of claim 8, further comprising:
a wireless transceiver;
wherein prior to the connecting with the vehicle, the operations further comprise:
communicating with the device associated with the vehicle using the wireless transceiver; and
navigating the unmanned aerial vehicle to the vehicle based on the communicating with the device.

11. The unmanned aerial vehicle of claim 10, wherein the wireless transceiver communicates with the device through wireless signals, and wherein the navigating the unmanned aerial vehicle to the vehicle uses at least a received signal strength indicator (RSSI) of the wireless signals.

12. The unmanned aerial vehicle of claim 1, wherein the operations further comprise reducing a power consumption of the unmanned aerial vehicle after the connecting.

13. The unmanned aerial vehicle of claim 1, further comprising:
a data communication interface comprising one of a wired data connector or a wireless transceiver,
wherein the utilizing the data processing service comprises one of transmitting data to a data processor using a network connection of the device via the data communication interface or processing the data with an application of the device via the data communication interface.

14. A method comprising:
- receiving delivery flight route instructions for a flight of an unmanned aerial vehicle to a destination location;
- determining a first vehicle travelling on a first travel route and accessible to the unmanned aerial vehicle on a delivery flight route to the destination location;
- determining a first flight route for the unmanned aerial vehicle to a first geo-location along the first travel route;
- causing the unmanned aerial vehicle to travel along the first flight route to the first geo-location;
- detecting the first vehicle at the first geo-location;
- causing the unmanned aerial vehicle to connect with the first vehicle at the first geo-location;
- in response to the unmanned aerial vehicle connecting with the first vehicle, connecting with a device of the first vehicle; and
- utilizing, based on the connecting with the device, a data processing service of the device when the unmanned aerial vehicle is connected with the first vehicle.

15. The method of claim 14, wherein detecting the first vehicle at the first geo-location comprises:
- capturing an image of the first vehicle using a camera of the unmanned aerial vehicle; and
- performing an authentication of the first vehicle using the image, wherein the causing the unmanned aerial vehicle to connect with the first vehicle is performed in response to the authentication of the first vehicle.

16. The method of claim 14, further comprising:
- receiving a change to the first travel route of the first vehicle at a point past the first geo-location; and
- causing the unmanned aerial vehicle to disconnect from the first vehicle based on the change.

17. The method of claim 16, further comprising:
- in response to the first vehicle disconnecting from the unmanned aerial vehicle at a disconnection location, determining a second vehicle on a second travel route accessible to the unmanned aerial vehicle from the disconnection location; and
- causing the unmanned aerial vehicle to connect with the second vehicle along the second travel route.

18. A non-transitory machine-readable medium having stored thereon machine-readable instructions executable to cause a machine to perform operations comprising:
- receiving a destination endpoint for an unmanned vehicle;
- determining a vehicle for connecting to the unmanned vehicle for at least a portion of a travel to the destination endpoint, based at least in part on a travel speed of the vehicle or a power savings realized by the unmanned vehicle when connected to the vehicle;
- determining a first travel route to a location for the unmanned vehicle and a first time to meet the vehicle;
- determining a second time to disconnect the vehicle from the unmanned vehicle prior to the vehicle reaching the destination endpoint;
- communicating the first travel route and the second time to a control unit of the unmanned vehicle;
- detecting a connection between the unmanned vehicle and the vehicle at the location;
- in response to the detecting, connecting with a device of the vehicle; and
- utilizing, based on the connecting with the device, a data processing service of the device based on the connection between the unmanned vehicle and the vehicle.

19. The non-transitory machine-readable medium of claim 18, wherein the operations further comprise:
- determining a second vehicle for connecting to the unmanned vehicle for a second portion of the travel to the destination endpoint after the second time;
- determining a second travel route to the second vehicle by the unmanned vehicle; and
- communicating the second travel route to the control unit of the unmanned vehicle.

20. The non-transitory machine-readable medium of claim 18, wherein the operations further comprise causing the unmanned vehicle to reduce power usage while connected to the vehicle.

* * * * *